(12) United States Patent
Bourque (10) Patent No.: US 11,585,545 B2
(45) Date of Patent: Feb. 21, 2023

(54) RIDGE VENT

(71) Applicant: SNOWVENTCO LIMITED, Foxboro (CA)

(72) Inventor: Antoine Bourque, Foxboro (CA)

(73) Assignee: SNOWVENTCO LIMITED, Foxboro (CA)

( * ) Notice: Subject to any disclaimer, the term of this patent is extended or adjusted under 35 U.S.C. 154(b) by 350 days.

(21) Appl. No.: 15/832,153

(22) Filed: Dec. 5, 2017

(65) Prior Publication Data

US 2018/0156480 A1 Jun. 7, 2018

Related U.S. Application Data

(63) Continuation-in-part of application No. 15/252,672, filed on Aug. 31, 2016, now Pat. No. 10,295,208, (Continued)

(51) Int. Cl.
*F24F 7/02* (2006.01)
*E04D 13/17* (2006.01)
(Continued)

(52) U.S. Cl.
CPC .............. *F24F 7/02* (2013.01); *B01D 46/00* (2013.01); *B01D 46/0004* (2013.01);
(Continued)

(58) Field of Classification Search
CPC .......... F24F 7/02; F24F 5/0035; F24F 12/006; B01D 46/00; B01D 46/0004;
(Continued)

(56) References Cited

U.S. PATENT DOCUMENTS 2,019,213 A 10/1935 Dahlman
2,628,551 A 2/1953 Leigh
(Continued)

FOREIGN PATENT DOCUMENTS

CN 204268675 U 4/2015
CN 207357981 U 5/2018
(Continued)

OTHER PUBLICATIONS

International Search Report and Written Opinion dated Mar. 13, 2018, in related PCT Application No. PCT/CA2017/000261.
(Continued)

*Primary Examiner* — Steven S Anderson, II (57) ABSTRACT

A ridge vent for ventilating a roof of a building via a hole along a roof ridge to atmosphere, the ridge vent comprising a first ridge vent panel: a flange portion for resting on the roof, the flange portion having an opening for overlapping with the hole, the flange portion having a first flange portion positioned to one side of the opening and a second flange portion positioned to another side of the opening, such that the first flange portion and the second flange portion are at an acute angle with respect to one another; a frame portion coupled to the flange portion and having sides extending upwardly from the flange portion about the opening, the frame portion for maintaining a cap portion in a spaced apart relationship with the flange portion; the cap portion connected to the frame portion and covering over the opening; a first corrugated filter plate extending between the cap portion and the flange portion and positioned transversely between the opening and the atmosphere, the first corrugated filter plate positioned to said one side of the opening; and a second corrugated filter plate extending between the cap and the flange portion and positioned transversely between the opening and the atmosphere, the second corrugated filter plate positioned to said another side of the opening; wherein
(Continued)

the corrugated filter plates providing for a passage of air between the atmosphere and the opening, the corrugated filter plates having a pore size sufficient for facilitating the air passage of air through the corrugated filter plates while blocking passage of atmospheric particles through the corrugated filter plates.

11 Claims, 7 Drawing Sheets

Related U.S. Application Data which is a continuation of application No. 14/271,824, filed on May 7, 2014, now Pat. No. 9,457,304, which is a continuation-in-part of application No. 13/290,182, filed on Nov. 7, 2011, now Pat. No. 10,018,368.

(60) Provisional application No. 62/430,052, filed on Dec. 5, 2016.

(51) Int. Cl.
  *F24F 5/00* (2006.01)
  *F24F 12/00* (2006.01)
  *B01D 46/00* (2022.01)
  *B01D 46/52* (2006.01)

(52) U.S. Cl.
  CPC ........... *E04D 13/17* (2013.01); *E04D 13/174* (2013.01); *E04D 13/178* (2013.01); *F24F 5/0035* (2013.01); *F24F 12/006* (2013.01); B01D 46/521 (2013.01); B01D 2279/35 (2013.01); Y02B 30/56 (2013.01)

(58) Field of Classification Search
  CPC .. B01D 46/521; B01D 2279/35; E04D 13/17; E04D 13/174; E04D 13/178; Y02B 30/56
  See application file for complete search history.

(56) References Cited

U.S. PATENT DOCUMENTS

| | | | |
|---|---|---|---|
| 2,989,145 A | | 6/1961 | Goodloe |
| 3,183,822 A | | 5/1965 | Stone et al. |
| 3,216,578 A | * | 11/1965 | Muschamp .......... B01D 46/521 210/488 |
| 3,238,862 A | | 3/1966 | Smith et al. |
| 3,302,554 A | | 2/1967 | Rousey et al. |
| 3,494,113 A | | 2/1970 | Kinney |
| 3,593,478 A | | 7/1971 | Mason |
| 4,461,066 A | | 7/1984 | Peterson |
| 4,572,059 A | | 2/1986 | Ramsay |
| 4,593,504 A | | 6/1986 | Bonnici et al. |
| 4,621,569 A | | 11/1986 | Fioratti |
| 4,817,506 A | | 4/1989 | Cashman |
| 5,005,328 A | | 4/1991 | Holtgreve |
| 5,022,314 A | | 6/1991 | Waggoner |
| 5,094,041 A | | 3/1992 | Kasner et al. |
| 5,427,571 A | | 6/1995 | Sells |
| 5,505,852 A | | 4/1996 | van Rossen |
| 5,564,876 A | | 10/1996 | Muller et al. |
| 5,603,657 A | | 2/1997 | Sells |
| 5,704,834 A | | 1/1998 | Sells |
| 5,803,806 A | | 9/1998 | Blessinger |
| 5,921,863 A | | 7/1999 | Sells |
| 5,960,595 A | | 10/1999 | McCorsley, III et al. |
| 5,989,303 A | | 11/1999 | Hodge |
| 6,155,008 A | | 12/2000 | McKee |
| 6,298,613 B1 | | 10/2001 | Coulton et al. |
| 6,302,787 B1 | | 10/2001 | Graft, Jr. |
| 6,308,473 B1 | | 10/2001 | Auck |
| 6,309,546 B1 | | 10/2001 | Herrmann et al. |
| 6,319,300 B1 | | 11/2001 | Chen |
| 6,361,434 B1 | | 3/2002 | Brandon |
| 6,450,882 B1 | | 9/2002 | Morris et al. |
| 6,558,251 B2 | | 5/2003 | Sells |
| 6,589,113 B2 | | 7/2003 | Sells |
| 6,623,354 B2 | | 9/2003 | Morris et al. |
| 6,723,150 B2 | * | 4/2004 | Parker ................ B01D 46/0005 55/490 |
| 6,767,281 B2 | | 7/2004 | McKee |
| 6,805,627 B2 | | 10/2004 | Marts et al. |
| 6,978,803 B2 | | 12/2005 | Brown et al. |
| 7,063,733 B2 | | 6/2006 | Mori et al. |
| 7,182,688 B2 | | 2/2007 | Coulton |
| 7,191,564 B2 | | 3/2007 | Higginbotham |
| D556,314 S | | 11/2007 | Daniels, II et al. |
| 7,384,331 B2 | | 6/2008 | Coulton |
| 7,485,034 B2 | | 2/2009 | Sells |
| 7,544,124 B2 | | 6/2009 | Polston |
| 7,708,625 B2 | | 5/2010 | Leseman et al. |
| 7,774,999 B2 | | 8/2010 | McKee |
| 7,780,510 B2 | | 8/2010 | Polston |
| 8,205,401 B2 | | 6/2012 | Ward |
| 8,209,923 B1 | | 7/2012 | Rich |
| 8,322,089 B2 | | 12/2012 | Railkar et al. |
| 2001/0019941 A1 | * | 9/2001 | Headrick .............. E04D 13/174 454/365 |
| 2001/0049261 A1 | | 12/2001 | McKee et al. |
| 2005/0239392 A1 | | 10/2005 | Sells |
| 2006/0116069 A1 | | 6/2006 | Urbanski et al. |
| 2007/0256399 A1 | | 11/2007 | Yang |
| 2008/0160903 A1 | | 7/2008 | Fontana |
| 2008/0220714 A1 | | 9/2008 | Caruso et al. |
| 2008/0287053 A1 | | 11/2008 | Carlson et al. |
| 2009/0013620 A1 | | 1/2009 | West |
| 2010/0107550 A1 | | 5/2010 | Toas et al. |
| 2010/0162643 A1 | | 7/2010 | Blomberg et al. |
| 2010/0255770 A1 | | 10/2010 | Blake et al. |
| 2011/0201266 A1 | | 8/2011 | Henderson |
| 2014/0342658 A1 | | 11/2014 | Parkinson et al. |
| 2015/0321131 A1 | | 11/2015 | Bourque et al. |
| 2016/0069082 A1 | * | 3/2016 | Glick, Jr. .............. E04D 13/174 52/90.2 |

FOREIGN PATENT DOCUMENTS

| | | |
|---|---|---|
| DE | 3611163 A1 | 10/1987 |
| JP | 2007289868 A | 11/2007 |

OTHER PUBLICATIONS

International Search Report and Written Opinion dated Sep. 1, 2015, in related PCT Application No. PCT/CA2015/000304.
Canadian Intellectual Property Office, Office Action dated May 7, 2014, in related Canadian Patent Application No. 2764725.
Canadian Intellectual Property Office, Office Action dated Dec. 6, 2013, in related Canadian Patent Application No. 2764725.

* cited by examiner

RIDGE VENT

CROSS-REFERENCE TO RELATED APPLICATIONS

This application claims priority from U.S. Provisional Patent Application No. 62/430,052, filed on Dec. 5, 2016; the entire contents of which are hereby incorporated by reference herein.

This application is a continuation-in-part of U.S. patent application Ser. No. 15/252,672, filed on Aug. 31, 2016, which is a continuation of U.S. patent application Ser. No. 14/271,824, filed on May 7, 2014, now U.S. Pat. No. 9,457,304, issued on Oct. 4, 2016, which is a continuation-in-part of U.S. patent application Ser. No. 13/290,182, filed on Nov. 7, 2011; the entire contents of all of which are hereby incorporated by reference herein.

FIELD

This disclosure relates generally to ridge vents for venting the roof of a building such as a house.

BACKGROUND

Ridge vents provide the necessary ventilation to the roof of a house or other building, inhibiting condensation in the roof due to the infiltration or otherwise collection of moisture into the roof or attic cavity. Various ridge vents can employ vanes, grates, filters and louvers to permit air to be channeled between the roof and the atmosphere along the ridge of the building, while trying to inhibit rain from entering the roof through the vent. A variety of caps and covers have been used to act as a guard to prevent the infiltration of rain. However, prior art vents have thus far been ineffective in inhibiting the infiltration of snow and rain into the attic space, particularly in cases of snow storms, rain storms, and the like.

In the construction of various types of buildings, wood products are widely used as a base layer for a roof. That is, sheets of OSB sheathing or plywood are generally nailed or screwed to roof trusses or rafters to establish decking for the roof, typically followed by shingles being secured upon the sheets. Particularly when constructing a residential home, it is also common to form the roof with a peak and provide venting of an attic space at the peak or ridge of the roof via a ridge vent. Typically, a hole in the sheathing is established along the peak, with the sheathing opening directly into an attic space of the building. A ridge vent assembly, typically formed of various elongated, perforated members arranged in an overlapping manner, or otherwise rolled along in a continuous length, is then mounted over the sheathing opening along the entire peak. More specifically, the ridge vent assembly can include flanges mounted along each side of the peak, with the flanges sitting atop the shingles or otherwise interlaced with the shingles. With this construction, heated air that collects in the attic space is permitted to escape from the residence through the ridge vent assembly, thereby providing for a more energy efficient, configuration, particularly during summer months when an owner may be trying to cool the air in the home while the attic space contains rather hot air.

Certainly, the roof needs to be constructed in a manner which prevents the ingress of rain water. It is considered desirable to provide an arrangement which eases aspects of the overall construction, substantially inhibits the ingress of water/snow adjacent a ridge roof assembly and allows unobstructed flow of ventilation air moving under the sheathing and exiting the ridge vent.

Known ridge vents are typically formed using a non-woven synthetic fiber mat having randomly aligned fibers located over a vent slot at the roof ridge. Cap shingles are then installed over the non-woven synthetic fiber mat. The synthetic fiber mat allows for air flow through the slot at the roof ridge, while addressing ingress of moisture and debris. However, while this type of vent may not be effective at stopping the ingress of most moisture coming up the roof slope, for example due to wind driven rain.

Other known ridge vent systems utilize an open-celled foam material with an upper membrane of closed cell that covers the ridge vent slot. However, this comes in short lengths that must be pieced together. Additionally, the foam materials can retain moisture in the cells due to the meniscus forces of the water in the open cells, reducing the effective ventilation area, and thus defeating the purpose of the ridge vent.

Depending on the installation techniques used, generally all of the prior known systems can allow leakage due to wind driven rain, unless they account for such wind driven precipitation using adequate blocking techniques while at the same time making sure that there is a continued adequate (a specified minimum) amount of air flow through the ridge vent in the presence of the wind driven moisture. There needs a ridge vent design that provides for adequate air flow in the presence of wind driven precipitation, while inhibiting the infiltration of such wind driven precipitation into the roof cavity.

SUMMARY

It is an object of the present invention to provide a roof vent that obviates or mitigates at least some of the above-presented disadvantages in the art.

An improved ridge vent which facilitates adequate attic ventilation but at the same time inhibits the infiltration of snow particles, water droplets, water runoff of the roof surface, burning cinders, and/or other undesirable elements from the atmosphere from gaining entry into the roof via the ridge vent is desired.

A first aspect provided is a ridge vent for ventilating a roof of a building via a hole in the roof to atmosphere, the ridge vent comprising: a flange portion for resting on the roof, the flange portion having an opening for overlapping with the hole; a frame portion having sides extending upwardly from the flange portion about the opening, the frame portion for maintaining a cap portion in a spaced apart relationship with the flange portion; the cap portion connected to the frame portion and covering over the opening; and a corrugated filter plate extending between the cap and the flange portion and positioned transversely between the opening and the atmosphere, the corrugated filter plate providing for a passage of air between the atmosphere and the opening, the corrugated filter plate having a pore size sufficient for facilitating the air passage of air through the corrugated filter plate while blocking passage of atmospheric particles through the corrugated filter plate.

A second aspect provided is a ridge vent for ventilating a roof of a building via a hole along a roof ridge to atmosphere, the ridge vent comprising a first ridge vent panel: a flange portion for resting on the roof, the flange portion having an opening for overlapping with the hole, the flange portion having a first flange portion positioned to one side of the opening and a second flange portion positioned to another side of the opening, such that the first flange portion and the second flange portion are at an acute angle with respect to one another; a frame portion coupled to the flange portion and having sides extending upwardly from the flange portion about the opening, the frame portion for maintaining a cap portion in a spaced apart relationship with the flange portion; the cap portion connected to the frame portion and covering over the opening; a first corrugated filter plate extending between the cap portion and the flange portion and positioned transversely between the opening and the atmosphere, the first corrugated filter plate positioned to said one side of the opening; and a second corrugated filter plate extending between the cap and the flange portion and positioned transversely between the opening and the atmosphere, the second corrugated filter plate positioned to said another side of the opening; wherein the corrugated filter plates providing for a passage of air between the atmosphere and the opening, the corrugated filter plates having a pore size sufficient for facilitating the air passage of air through the corrugated filter plates while blocking passage of atmospheric particles through the corrugated filter plates.

BRIEF DESCRIPTION OF THE DRAWINGS

The foregoing and other aspects will now be described by way of example only with reference to the attached drawings, in which.

In the drawings like characters of reference indicate corresponding parts in the different figures.

DETAILED DESCRIPTION

Figure 1:
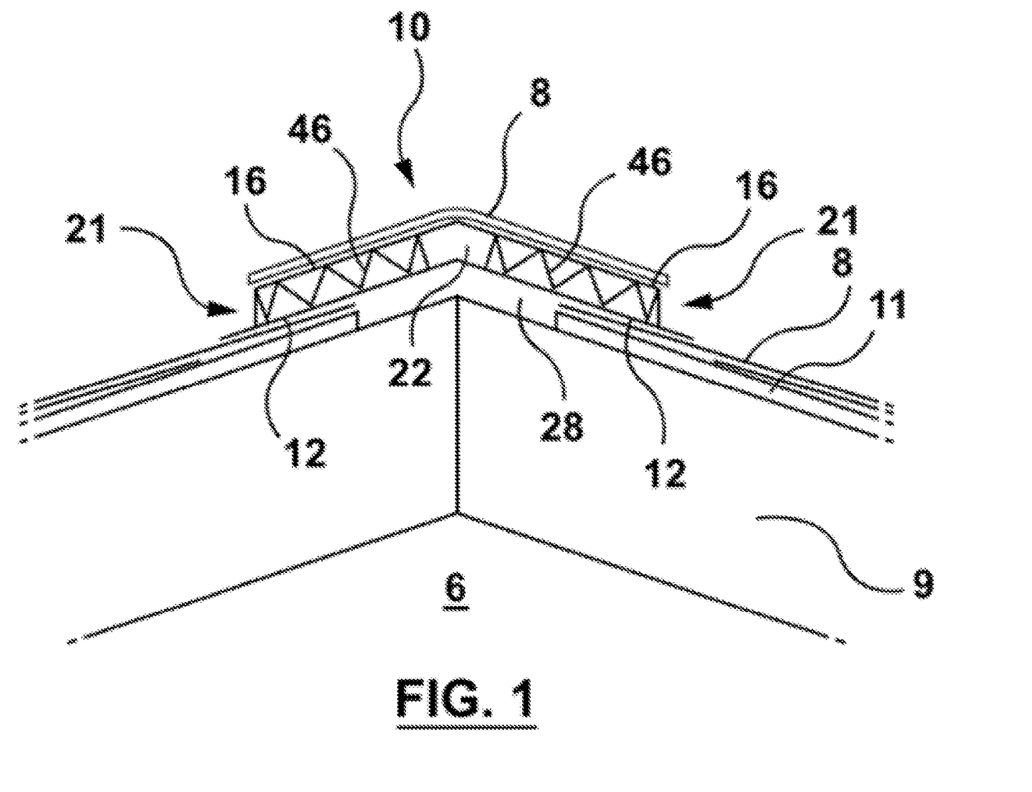
FIG. 1 is a side end view of a ridge vent.

Referring to FIG. 1, a ridge vent assembly 10 can include flanges 12 mounted along each side of the roof 9 peak, with the flanges 12 sitting atop the shingles 8 or otherwise interlaced with the shingles 8. With this construction, heated air that collects in the attic space 6 is permitted to escape from the residence (i.e. home) through the ridge vent assembly 10, thereby providing for a more energy efficient, configuration, particularly during summer months when an owner may be trying to cool the air in the home while the attic space contains rather hot air. The ridge vent 10 for asphalt shingle or composition roofs is situated over a vent slot 28 (i.e. hole) located through the roof structure/sheathing 11 along a roof 9 ridge.

Figure 6:
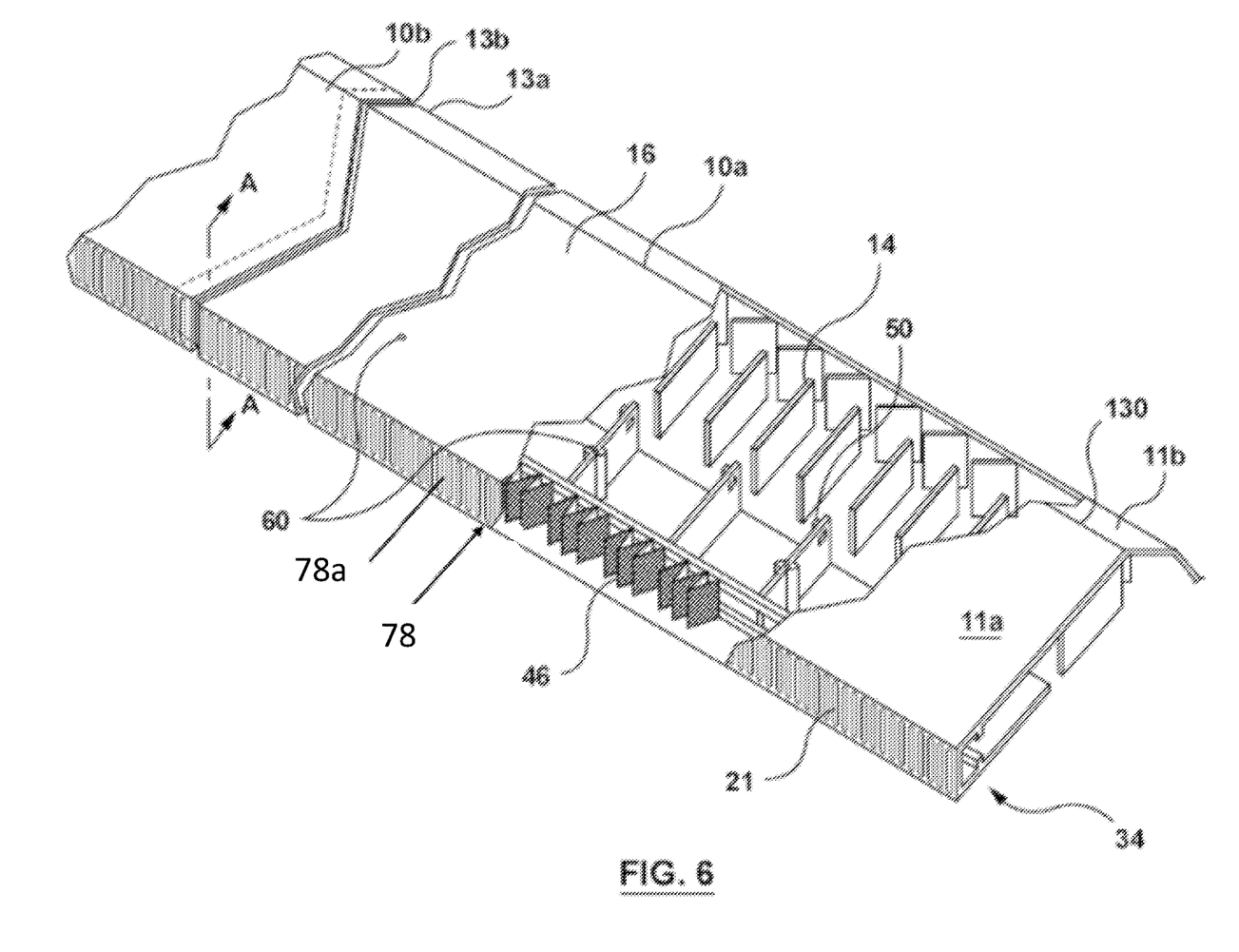
FIG. 6 is further perspective view of the ridge vent shown in FIG. 4.

The ridge vent assembly 10 is mounted along roof 9 peak as a series of interconnected (i.e. overlapping) angled panels 10a and 10b, see FIG. 6, via a series of adjacent male connector portions 13a and female connector portions 13b, such that the male connector portions 13a are received in the female connector portions 13b in an overlapping manner to inhibit the ingress of foreign matter (e.g. water) between the adjacent panels 10a, 10b. Further, the each of the panels 10a, 10b have portions 11a, 11b joined at a ridge portion 130, such that the portions 11a, 11b are at an acute angle with respect to one another measured from an interior of the ridge vent 10. It is clear that each of the portions 11a, 11b have a respective filter plate 46 running along a length of the portion 11a, 11b, so that the ridge vent 10 provides a separate and distinct filter plate 46 on either side of the hole 28 in the roof 9 and corresponding opening 22 in the flange portion 12 of the ridge vent 10. As such, each of the portions 11a, 11b of the flange portion 12 meet at the opening 22, which can ne continuous of segmented along the hole 28 between the portions 11a, 11b of the ridge vent 10. It is also recognized that the cap portion 16 (also referred to as ridge vent hood) also has corresponding portions 11a, 11b on either side of the ridge portion 130. It is important that each portion 11a, 11b of the cap portion 16 be distanced from each portion 11a, 11b of the flange portion 12 in order to provide for positioning of the filter plates 46 (on either side of the ridge portion 130) flush between an underside surface of the cap portion 16 and a top surface of the flange portion 12. It is recognized that the juxta positioning of the filter plates 46 between the cap 16 and flange 12 portions inhibits the penetration of foreign matter (e.g. water) between the spaced apart portions 12, 16 and into the hole 28 via the opening 22 in the flange portion 12, while at the same time facilitates the passage of air both into and out of the roof 9 interior 6 via the hole 28. For example, a filter frame 56 can have side walls 15 (see FIG. 9a, b) that can be used to abut one another and thus inhibit penetration of foreign matter between the adjacent lengths of the filter plates 46 in the adjacent vent sections 10a, b. For example, between adjacent sidewalls 15 there can be positioned a resilient seal (e.g. foam, rubber, etc.) to inhibit penetration of foreign matter between the adjacent lengths of the filter plates 46 when situated within the filter frames 56. It is recognized that the filter frame 56 can be positioned between the cap portion 16 and the flange portion 12 when installed in the ridge vent 10 as assembled. It is also recognized that a resilient seal can be positioned between the connectors 13a, b to inhibit the penetration of the foreign particles, as desired.

Figure 5:
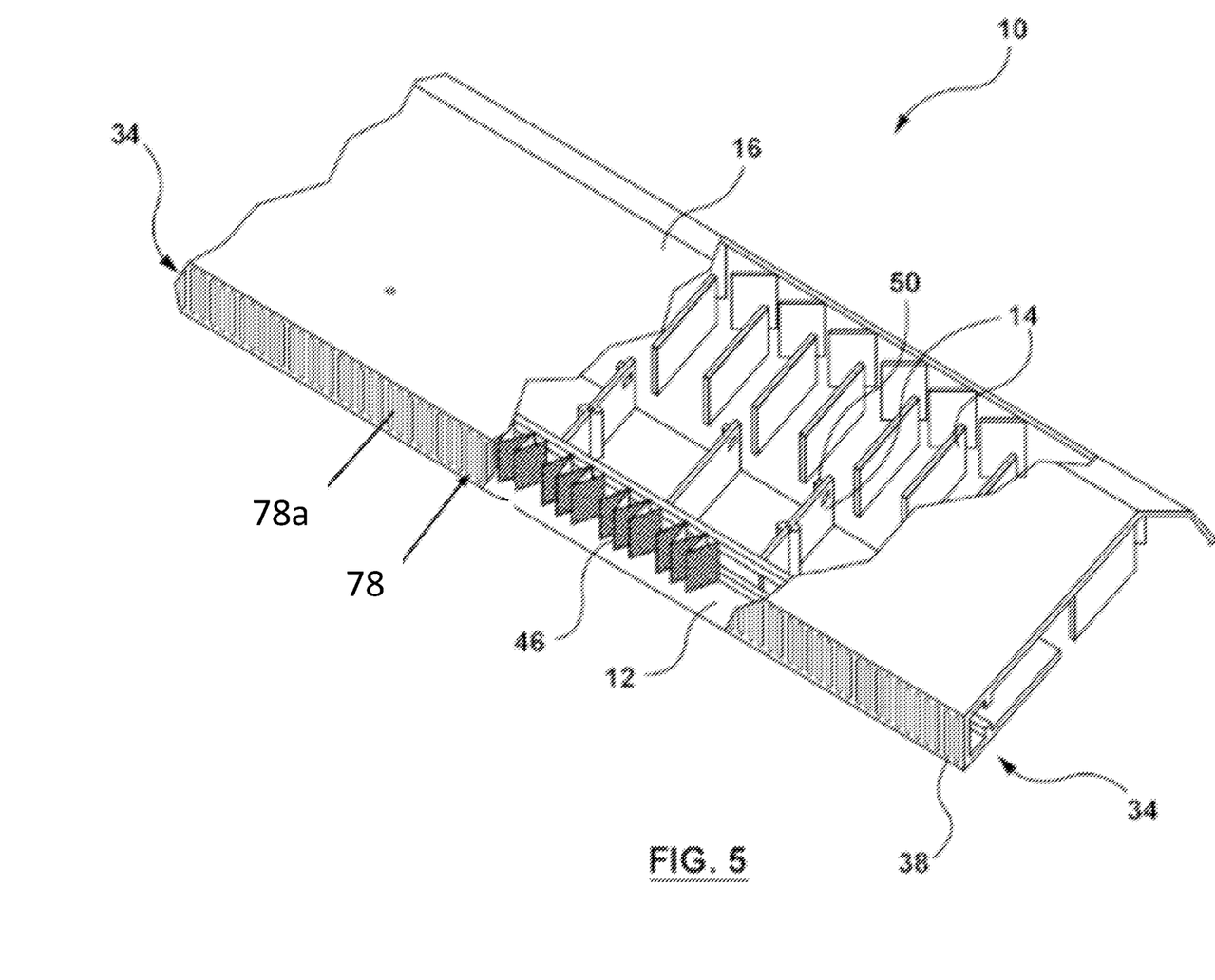
FIG. 5 is a perspective view of the ridge vent shown in FIG. 4.
Figure 10:
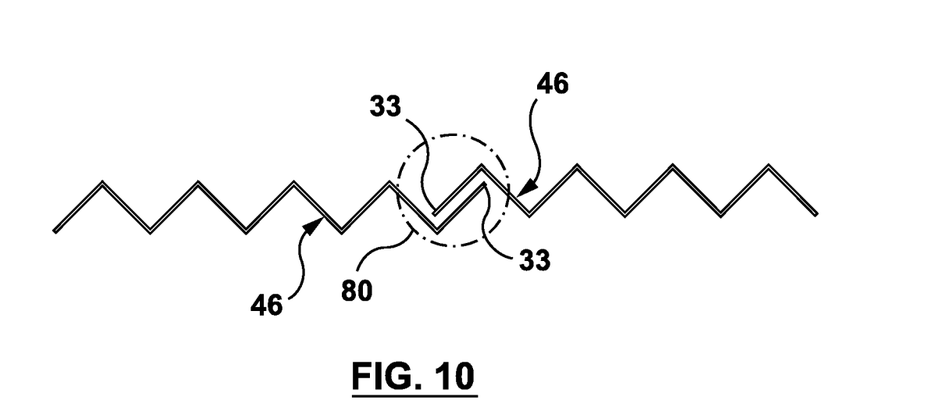
FIG. 10 shows an alternative embodiment of sealing between adjacent filter plates of the ridge vent of FIG. 1.

As is further described below, it is clear that the adjacent filter plates 46 of the ridge vent portions 10a, 10b also have connectors (e.g. block sections 38, see FIG. 5, so as to inhibit the penetration of foreign matter between the adjoining segments of the filter plates 46 (i.e. those adjacent filter plates 46 respective of each adjacent vent portion 10a, 10b. In terms of the vent portions 10a, 10b themselves, it is recognized that the connector portions 13a, b can be formed in the ends of the cap portion 16 and/or the flange portion 12, see FIGS. 8a, b. Shingles 8 can then be used to secure ridge vent 10 to roof decking 11 with mechanical fasteners (e.g. such as nails, not shown), see FIG. 1. Referring to FIG. 10, another embodiment is where the adjacent filter plates 46 can have one or more overlapping folds in an overlap region 80, so as to inhibit the penetration of the foreign matter between the ends 33 of the adjacent filter plates 46. For example an end 33 of one filter plate 46 can be overlapping a fold line 35 of the adjacent filter plate 46 in the overlap region 80. Further, for example the fold line 35 of one filter plate 46 can be overlapping the fold line 35 of the adjacent filter plate 46 in the overlap region 80.

Figure 3:
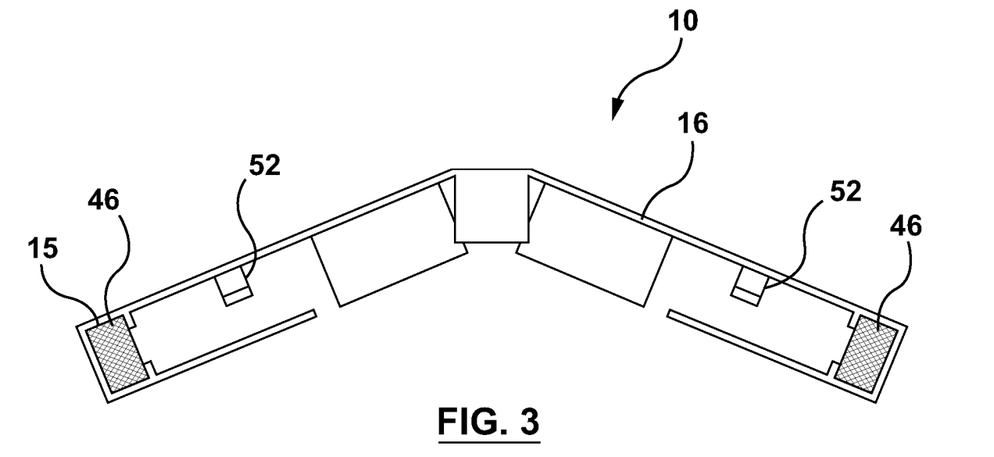
FIG. 3 is a cross sectional view of a cap of ridge vent shown in FIG. 2.
Figure 4:
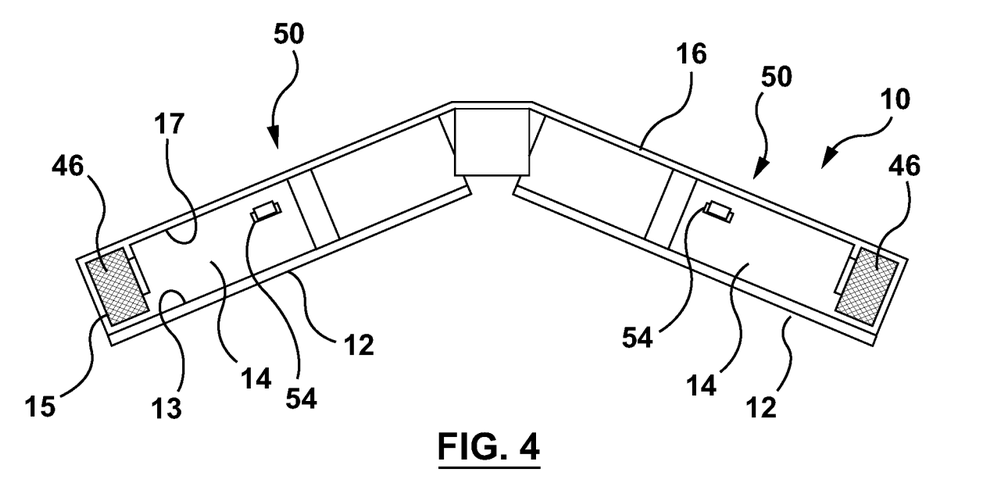
FIG. 4 is an side end view of the ridge vent shown in FIG. 3 with flange portion connected.

FIGS. 1, 3, 4 show the ridge vent 10 for ventilating the roof 9 of the building to the atmosphere. The ridge vent 10 includes the flange portion 12 to lay against the roof sheathing 11, the flange portion 12 having the opening 22 to let air vent from the interior 6 of the building (e.g. an attic). The ridge vent 10 includes one or more support (i.e. frame) portions 14 (see FIG. 5) extending from the flange portion 12 to support a cap 16 dimensioned and configured to cover over the opening 22 (including a hole 28 in the roof) and over the support frame portion 14. The support portions 14 are configured to provide a passage (between the flange portion 12 and the cap 16) through which air can pass between the atmosphere and the opening 22, which can include a series of baffles 50 positioned on one or both of the flange portion 12 and the cap portion 16 in order to direct airflow as well as to inhibit a decrease in the separation distance (proportional to the available cross sectional area for airflow within the ridge vent 10 between the opposing filter plates 46) between the cap portion 16 and the flange portion 12. The ridge vent 10 also includes the corrugated filter plate or strip 46, e.g. covered by the cap 16, on either side of the ridge vent 10 and positioned on either side of the central opening 22 between the cap 16 and the flange portion 12. The corrugated filter plates 46 can have a pore size 47 (e.g. perforations, holes, a plurality of apertures, etc.—see FIG. 7) sufficient to facilitate air to pass through the corrugated filter material 46 (e.g. from one side 19 of the corrugated filter material 46 to the other 19) but inhibit the passage of snow particles, cinder particles and/or water droplets there-through (e.g. from one side 19 of the corrugated filter material 46 to the other 19).

Figure 2:
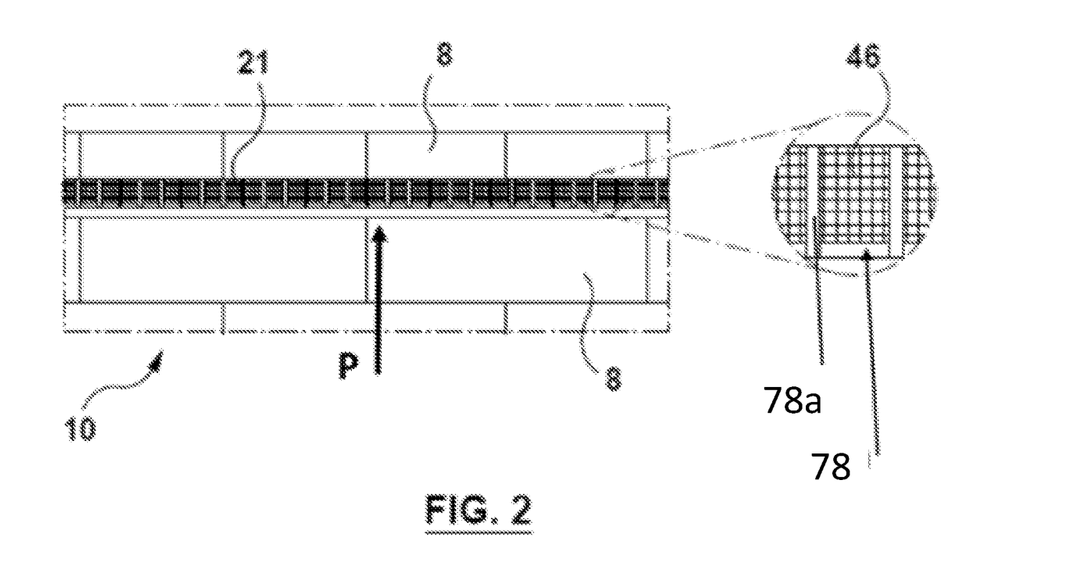
FIG. 2 is a side view of the ridge vent shown in FIG. 1.

In any event, it is recognized that the purpose of the corrugated filter material 46 is to provide for the flow through of air while inhibiting the passage of undesirable particles/droplets (e.g. solid and/or liquid pieces of matter) through the corrugated filter material 46 impinging from the atmosphere and into the interior of the roof via the opening 22 and adjacent hole 28. Referring to FIGS. 1 and 5, shown are optional ventilation openings 21 (e.g. slots) in a structure 78a, in order to facilitate deflection of larger debris (e.g. twigs, etc.) from impinging on the corrugated filter plate 46, in particular the ventilation openings 21 can be distributed along the face and length of the filter plates 46 and as such inhibit damage to the filter plates 46 from larger debris trying to enter the opening (i.e. separation space) between the cap portion 16 and the flange portion 12. Further, optionally there can be a collar portion 78 (see FIG. 2 and FIG. 5) of the structure 78a, such that an upstanding wall (e.g. the collar portion 78) projects from the flange portion 12 and thus is used to block water or other foreign particles P being driven by the wind along the shingles 8. The structure 78a has both the collar portion 78 and the ventilation openings 21. In this sense, the collar portion 78 acts as a particulate shield for particulate (e.g. water) being driven along the surface of the shingles 8, however it is recognized that the collar portion 78 only projects a portion of the separation distance between the cap portion 16 and the flange portion 12, so as to allow for exposure of the filter plate 46 to the passage of air between the cap portion 16 and the flange portion 12. It is recognized that the collar portion 78 can extend from one end to the other end of each of the ridge vent portions 10a, b, as desired.

Also shown are fastener locations 60 (e.g. nail holes) for positioning fasteners (e.g. nails) to fasten the ridge vent assembly 10 to the roof sheathing 11. It is recognized that the fastener location 60 (e.g. hole or indicia) in the cap portion 16 can be aligned with a fastener location 60 (e.g. tube, hole, or indicia, etc.) as part of the support portion 14 and/or the flange portion 12.

It is recognized that there can be a number of different options for positioning/orienting the corrugated filter plate 46. For example, the corrugated filter plate 46 can be positioned as extending upwardly (see FIG. 5) between the flange portion 12 and the cap 16 (covering the opening 22). In this example, the edges 41 (see FIG. 7) of the corrugated filter plate 46 are positioned adjacent to surfaces 13, 17 of the flange portion 12 and cap portion 16 respectively. Further, fold lines 35 extend from one edge 41 to the other edge 41 of the filter plate 46. As well, the fold lines 35 are positioned serially along the filter plate 46 length from one side 33 to the other side 33, i.e. along the length of the surfaces 13, 17 and somewhat parallel to the hole 28 running the length of the roof 9 ridge.

Figure 7:
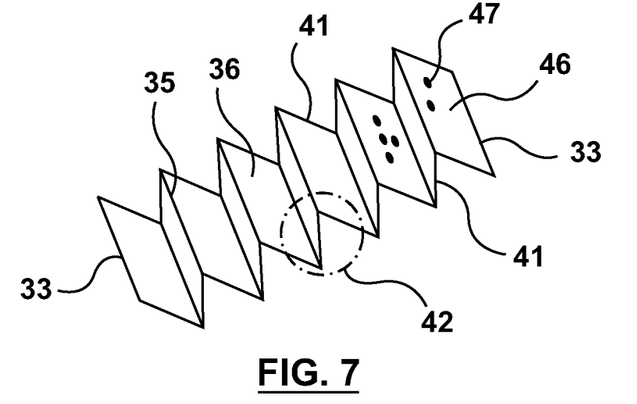
FIG. 7 is a perspective view of a portion of the filter plate portion of the ridge vent shown in FIG. 1.

Further, for example, the corrugated filter plate 46 can be positioned as extending along (see FIG. 1) between the flange portion 12 and the cap 16 (covering the opening 22). In this example, the fold regions 42 (see FIG. 7) of the corrugated filter plate 46 are positioned along their length adjacent to surfaces 13, 17 of the flange portion 12 and cap portion 16 respectively. As seen in FIG. 7, the fold regions 42 extend between opposed edges 41 of the corrugated filter plate 46. It is recognized that the corrugated filter plate 46 can be in contact with a top surface 13 of the flange portion 12, in contact with an underside surface 17 of the cap 16, and/or in contact with the top surface 13 of the flange portion 12 and with the underside surface 17 of the cap 16. It is recognized that a sidewall 15 (e.g. abutment wall—see FIG. 4) extending upwardly from the top surface 13 of the flange portion 12 can also be considered as part of the top surface 13 of the flange portion 12. It is recognized that a sidewall 15 extending downwardly from the bottom/underside surface 17 of the cap 16 can also be considered as part of the bottom/underside surface 17 of the cap 16. Further, the abutment walls 15 can be included as part of a filter frame 56 (see FIG. 9a, b). For example, the abutment walls 15 can be used to seal the ends 33 of the adjacent filter plates 46 with respect to one another.

Corrugated (see FIG. 7) can refer to draws or bends into folds (i.e. folded regions 42) or alternate furrows and ridges of the surface of the filter plate 46. A corrugated surface 36 can also refer to a pleated surface 36. A corrugated surface 36 can also refer to a shape into folds of parallel and alternating ridges 35 and grooves 35. The juncture between the folds can be well defined (e.g. a crease line 35) or can be distributed over the surface 36 (e.g. an arcuate change in direction from one fold to the next, such as an arcuate portion of the surface 36 of the corrugated filter material 46). For example, the corrugated filter material 46 (e.g. plate) can be a single walled surface 36 as shown, can be a double walled structure, not shown, (e.g. having a space between adjacent walls having a corrugated surface 36, etc, as positioned on one side of the opening 22). Preferably the corrugated filter material 46 has a corrugated surface 36 exposed to the passage of air impinging on the corrugated filter material 46 from the atmosphere and directed towards the opening 22 (and overlapping hole 28 in the roof membrane 11 of the building) and into the roof cavity 6 (e.g. attic space). Preferably the corrugated filter material 46 has a corrugated surface 36 exposed to the passage of air impinging on the corrugated filter material 46 from the exiting the roof cavity (e.g. attic space) and directed towards the opening 22 (and overlapping hole 28 in the roof membrane 11 of the building) and into the atmosphere.

In terms of positioning of the corrugated filter material 46 with respect to the cap 16 (at least covering the opening 28) and with respect to the flange portion 12, the corrugated filter material 46 is positioned transverse to both of the cap 16 (e.g. underside surface 17 of the cap 16) and the flange portion 12 (e.g. upper surface 13 of the flange portion 12). As such, it is recognized that the corrugated filter material 46 can be in contact with one of the surfaces 13, 17, with both of the surfaces 13, 17, an/or in contact with none of the surfaces 13, 17 (e.g. suspended between the surfaces 13, 17 by a secondary structure (i.e. filter frame 56) that can also be used to position the cap 16 in a spaced apart relationship between the flange portion 12 and the cap portion 16. For example, the secondary structure can be provided by the support portions 14 described herein as an example only. In any event, the corrugated filter material 46 extends transversely (in whole, in part, etc.) between the cap 16 and the flange portion 12 (e.g. base of the ridge vent 10). In terms of in-whole, then any passage of air between the opening 22 and the atmosphere would pass though the body of the corrugated filter material 46. Alternatively, in terms of in-part, some of the passage of air between the opening 22 and the atmosphere would pass though the body of the corrugated filter material 46 and passage of air between the opening 22 and the atmosphere would go around the body of the corrugated filter material 46. In terms of transverse, this can be referred to as situated or lying across (e.g. between the opposing surfaces 13, 17), lying sideways (e.g. between the opposing surfaces 13, 17), crosswise (e.g. between the opposing surfaces 13, 17), crossing from side to side (e.g. between the opposing surfaces 13, 17), athwart (e.g. between the opposing surfaces 13, 17), crossways (e.g. between the opposing surfaces 13, 17), lying or extending across or in a cross direction (e.g. between the opposing surfaces 13, 17), cross (e.g. between the opposing surfaces 13, 17). One example of transverse (e.g. between the opposing surfaces 13, 17) can be lying at right angles to or perpendicular to each or both of the opposing surfaces 13, 17). It is also recognized that the angle of the corrugated filter material 46, when extending away from (either in or out of contact with the actual surface 13, 17) the surface 13, 17, can be other than 90 degrees, as desired.

The ridge vent 10 can be considered as a ridge vent type for natural ventilation, as using the process of supplying and removing air through an indoor space (e.g. attic) without using mechanical systems. Natural ventilation implemented by the ridge vent 10 can refer to the flow of external air to an indoor space as a result of pressure or temperature differences. There can be two types of natural ventilation occurring in buildings: wind driven ventilation and buoyancy-driven ventilation. While wind can be the main mechanism of wind driven ventilation, buoyancy-driven ventilation can occur as a result of the directional buoyancy force that results from temperature differences between the interior and exterior of the building. Alternatively, natural ventilation can be referred to as passive ventilation, as a way to provide attic ventilation for shingle roof assemblies is by nonpowered, passive ventilation based ridge vent 10. This method relies primarily on natural air convection—the upward movement of heated air because of its lower density—but may also take advantage of wind-generated pressure differences.

Natural convection can initiate the upward flow of air through an attic and through the ridge vent 10. This air current can be maintained to aid in continuous circulation of air through the attic if intake vents placed low in the attic make colder air available to replace the heated air exhausted through vents placed high in the attic. Convection-assisted ventilation can be effective when approximately equal amounts of ventilation opening areas are placed at the soffits or eave and at or near the top of the attic space, referred to as "balanced ventilation." It is also recognized that the ridge vent 10 can be a powered type ridge vent rather than a passive type. For example, the ridge vent 10 can have a powered unit, e.g. a fan with corresponding drive mechanism (e.g. motor) for assisting flow of the passage of air through the corrugated filter plate 46.

In terms of the net free cross sectional area for the passage of air through the corrugated filter plate 46, the aggregate total open area (e.g. summation of the effective open area of each of the individual pore 47 cross sectional areas) of the plurality of holes/pores 47 can be configured to satisfy a minimum net open area threshold. For example, the open area threshold can be approximately 50 square inches of flow ability (e.g. net free area) available for the passage of air to flow through. It is recognized that the minimum net open area threshold can be a standard defined threshold, different for each country, province, and/or state based building codes/standards. In an example where the corrugated filter plate 46 does not extend from surface 13 to surface 17, the total net free air flow area available would be the aggregate of the effective open area of each of the individual pore 47 cross sectional areas of the corrugated filter plate 46 and the open cross sectional area of an air gap between an end of the filter plate 46 and the adjacent surface 13, 17.

Referring to FIG. 1, 3, the ridge vent 10 provides for roof ventilation while at the same time inhibiting the infiltration of snow, water, cinders, etc. (e.g. undesired particles) into the attic. The ridge vent 10 has the flange portion 12, the support portion 14 (shown as an example embodiment) and the cap 16 configured to cover over of the support portion 14 and to cover over the corrugated filter plate 46. Flange portion 12 is preferably flat to rest flush with the roof sheathing 11 to make it easy to install the ridge vent 10. Support portion 14 extends (e.g. perpendicularly) upward from flange 12. Cap 16 is dimensioned to enclose the support portions 14 but to leave ventilation regions (e.g. slots 21) between the cap 16 and flange portion 12 to permit atmospheric air to pass through corrugated filter plate 46 and around the support portions 14. Referring to FIGS. 3 and 4, shown by example is a series of connectors 50 (e.g. tabs 52 and slots 54), such that engagement of the connector portions 52, 54 with one another provides for coupling of the cap portion 16 to the flange portion 12, thereby sandwiching the corrugated filter plate 46 there between. For example, the tabs 52 connected to the cap portion 16 can have a hook to interlock with slots 54 of the flange portion 12 (e.g. the slots 54 are positioned in the support portions 14). It is also recognized that the tabs 52 connected to the flange portion 12 can have a hook to interlock with slots 54 of the cap portion 16 (e.g. the slots 54 are positioned in the support portions 14). As such, the connectors 50 are provided in opposed positions of the cap portion 16 and the flange portion 12 so as to facilitate assembly of the portions 12, 16 to one another as a single unit prior to fastening to the roof sheathing 11 via fasteners (e.g. nails). It is also recognized that the ridge vent assembly 10 can be integrally formed as a single piece panel 10a, 10b with corrugated filter plate 46 positioned within the interior of each of the panels 10a, 10b, as an alternative to an assembly of various individual portions 12, 16 with insertion of the corrugated filter plate 46 there between prior to assembly of the individual portions 12, 16 via the portion connectors 50 (e.g. positioned on the support portions 14).

The support portion 14 is one example of a frame (e.g. frame portion 14) that can provide for structural rigidity between the cap 16 and flange portion 12, thus providing for structural integrity of the ridge vent 10 in keeping the cap 16 at a spaced apart distance from the flange portion 12. It is also recognized that the frame portion 14 can be separate from the corrugated filter material 46 (e.g. the frame portion 14 and the corrugated filter material 46 are separate and distinct pieces of the ridge vent 10). It is also recognized that the frame portion 14 can be integrated with the corrugated filter material 46 (e.g. the frame portion 14 and the corrugated filter material 46 are an integrated component of the ridge vent 10). For example, the frame portion 14 with integrated corrugated filter material 46 can be attached to both the cap 16 and the flange portion 12, such that the frame portion 14 extends away (e.g. upwardly, downwardly, etc.) from the respective surfaces 13, 17.

The corrugated filter plate 46 can be a perforated plate which is corrugated to increase its surface area, thus providing for the passage of air through the surface 36 at a multiple of angles relating to the different surfaces of the folds 42 that are angles to one another. As such, the corrugated surface 36 has a greater surface area as compared to a corresponding planar surface of a side (e.g. slotted opening 21) of the ridge vent 10 (e.g. a planar cross sectional area of a bounded surface measured between an adjacent pair of end portions 34 of the ridge vent 10 and the adjacent and opposing surfaces 13, 17). The corrugated filter plate 46 can have a pore 47 size which is selected to inhibit the passage of atmospheric particles (e.g. snow particles) through the corrugated filter plate 46, while facilitating the flow of air through the corrugated filter plate 46 from side 19 to side 19. For example, a pore size of approximately 120 microns can inhibit the passage of snow while providing for adequate air circulation through the corrugated surface of the filter plate 46, as compared to the planar surface area of a non-corrugated cross sectional area of a side of the ridge vent 10 (e.g. covered by a fibrous layer that is non-corrugated—e.g. planar). The material of the corrugated filter plate 46 can be composed of metal, such as but not limited to stainless steel, aluminum, or other materials that can inhibit attachment of the particles (e.g. snow) to the corrugated surface 36, when the surface 36 is in an extending orientation (e.g. upwardly, away from, towards, etc.) with respect to the surface(s) 13, 17.

Figure 8A:
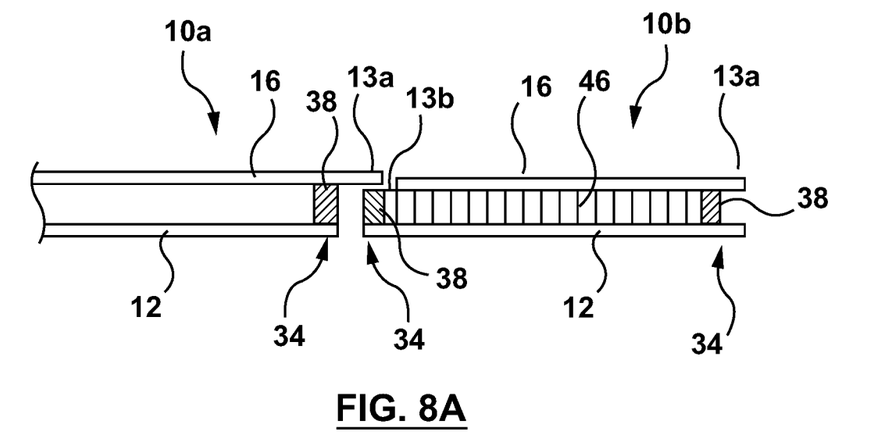
FIG. 8A is a further alternative embodiment the ridge vent shown in FIG 1.
Figure 8B:
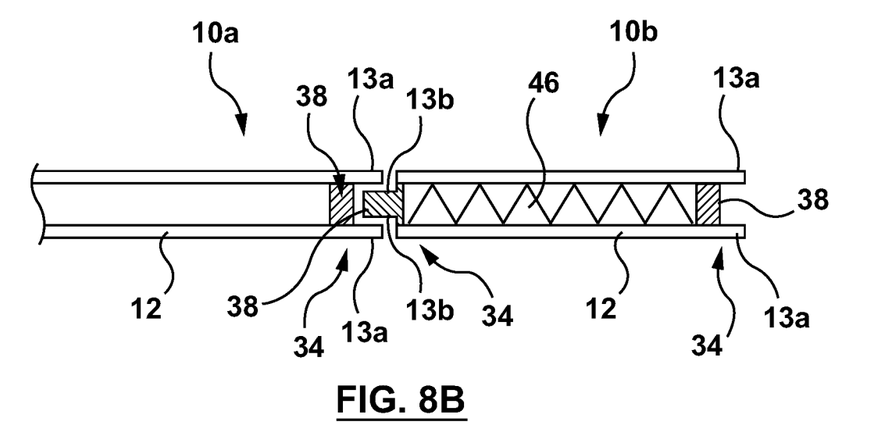
FIG. 8B is a further alternative embodiment the ridge vent shown in FIG. 1.

Referring to FIGS. 8a, b, the end portions 34 have panel connectors 13a, 13b to connect adjacent assembled panels 10a, 10b to one another, so as to form a continuous ridge vent assembly system 10 along the length of the roof 9 peak. The end portions 34 can also contain a block section 38 formed as part of the cap portion 16, the flange portion 12, the cap portion 16 and the flange portion 12, and/or as separate component assembled with the cap portion 16 and the flange portion 12 at the time of assembly of the ridge vent assembly 10. The block sections 38 can be composed of material (e.g. plastic) similar to the portions 12, 16 and they can be provided as an integral portion or separate portion to the portions 12, 16. The block sections 38 are closed to atmosphere and as such are non-slotted/non-perforated sections (i.e. inhibit airflow through the block sections 38). It is noted that the corrugated filter plate 46 sits between opposed block sections 38 (at either end 34 of the ridge vent assembly 10), such that airflow between the openings 21 and the hole 28 is directed only through the corrugated filter plate 46. The presence of the block sections 38 can provide, as one embodiment, for a seamless interconnection between corrugated filter plates 46 of adjacent panels 10a, b of the ridge vent assembly 10, when installed as a series of sections along the roof 9 peak. As such, preferably, the adjacent corrugated filter plates 46 can abut one another via the interposed block section 38, rather than in direct contact with one another (i.e. surface 36 of one plate 46 is in direct contact with the surface 36 of another adjacent plate 46, as shown alternatively in FIG. 10).

Referring back to FIG. 3, as mentioned previously, the corrugation of filter plate 46 (see FIG. 7) provides for a larger cross sectional surface area between the surfaces 13, 17, than what could be achieve by a similar planar porous layer, positioned on either side about the opening 21, thereby increasing the amount of filter media available to permit air to flow through the filter plate 46. It will be appreciated that numerous modifications can be made to invention without departing from the core of the invention.

Figure 9A:
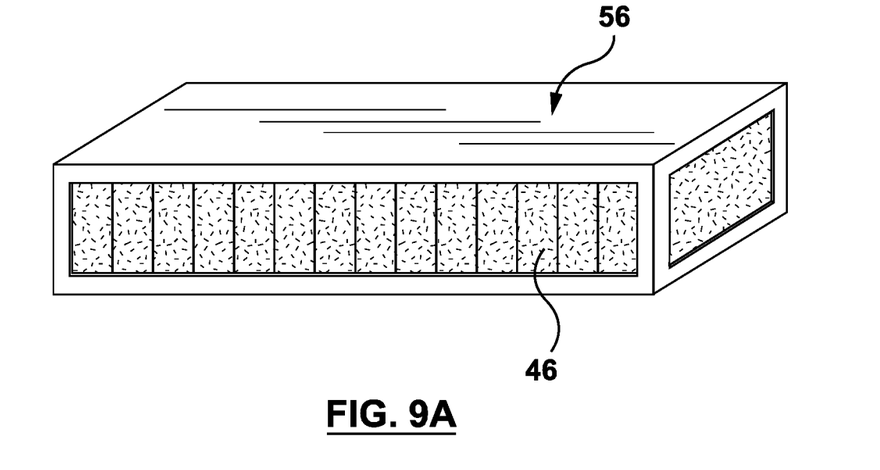
FIG. 9A is a further alternative embodiment the filter plate of the roof vent shown in FIG. 7.
Figure 9B:
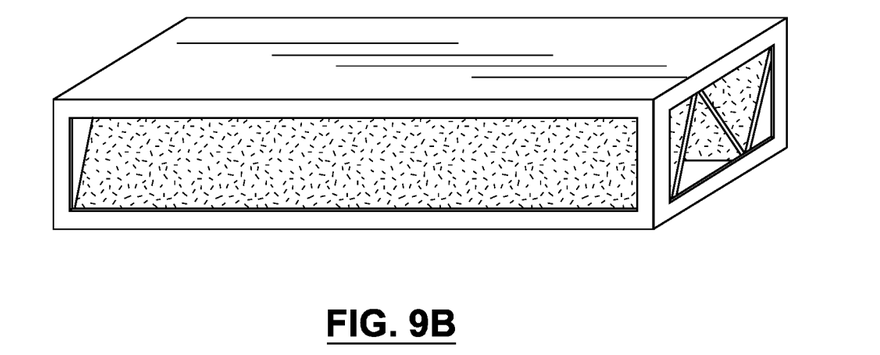
FIG. 9B is a further alternative embodiment the filter plate of the roof vent shown in FIG. 7.

For example, in FIG. 9a, b, an alternative embodiment of the corrugated filter plate 46 as a component of a ridge vent assembly 10 having a cap 16 positioned in a spaced apart relationship with the flange portion 12 by an intervening frame portion 14 (integrated with the filter plate 46, separate from the filter plate 46, etc.), the corrugated filter plate 46 can be positioned as a retrofit (e.g. optional insert module 56 to an off-the shelf roofing accessory) into an existing cap 12, frame 14, and flange configured ridge vent 10. For example, the flange portion 12 (e.g. with groove) and associated corrugated filter material 46 can be sold as an insert to be combined with an existing cap 16 and/or flange combination ridge vent 10.

It is recognized that the corrugated filter plate 46 can also be referred to as a corrugated filter strip 46 or corrugated filter structure 46. It is also recognized that the corrugated filter plate 46 can be provided as a replacement cartridge 56 (to replace a damaged filter plate) for an existing ridge vent. The replacement cartridge 56 can include the corrugated filter plate 46 as well as any of the components of the ridge vent provided for in the FIGS. 1-8a, b, as desired. For example, the replacement cartridge 56 for an existing ridge vent 10 for ventilating a roof 9 of a building via a hole 28 in the roof to atmosphere, the ridge vent 10 having a flange portion 12 connected to a cap 16 via a frame portion 14, the flange portion 12 for resting on the roof 9 and having an opening 22 for overlapping with the hole 28. The replacement cartridge 56 comprising a corrugated filter plate 46 for connecting with at least one of the flange portion 12, the cap 16 or the frame portion 14, the corrugated filter plate 46 for extending between the cap 16 and the flange portion 12 and for interposing between the opening 22 and the atmosphere, the corrugated filter plate 46 providing for a passage of air between the atmosphere and the opening 22, the corrugated filter plate 46 having a pore size sufficient for facilitating the air passage of air through the corrugated filter plate 46 while blocking passage of atmospheric particles through the corrugated filter plate 46.

A ridge vent for ventilating a roof of a building via a hole along a roof ridge to atmosphere, the ridge vent comprising a first ridge vent panel: a flange portion for resting on the roof, the flange portion having an opening for overlapping with the hole, the flange portion having a first flange portion positioned to one side of the opening and a second flange portion positioned to another side of the opening, such that the first flange portion and the second flange portion are at an acute angle with respect to one another; a frame portion coupled to the flange portion and having sides extending upwardly from the flange portion about the opening, the frame portion for maintaining a cap portion in a spaced apart relationship with the flange portion; the cap portion connected to the frame portion and covering over the opening; a first corrugated filter plate extending between the cap portion and the flange portion and positioned transversely between the opening and the atmosphere, the first corrugated filter plate positioned to said one side of the opening; and a second corrugated filter plate extending between the cap and the flange portion and positioned transversely between the opening and the atmosphere, the second corrugated filter plate positioned to said another side of the opening; wherein the corrugated filter plates providing for a passage of air between the atmosphere and the opening, the corrugated filter plates having a pore size sufficient for facilitating the air passage of air through the corrugated filter plates while blocking passage of atmospheric particles through the corrugated filter plates.

I claim:

1. A ridge vent for ventilating a roof of a building via a hole along a roof ridge towards the atmosphere, the ridge vent having a first ridge vent panel, the first ridge vent panel comprising:
    a flange portion for resting on the roof, the flange portion having an opening for overlapping with the hole, the flange portion having a first flange portion positioned to one side of the opening and a second flange portion positioned to another side of the opening, such that the first flange portion and the second flange portion are at an acute angle with respect to one another;
    a support frame portion coupled to the flange portion and having sides extending upwardly from the flange portion and positioned on each side of the opening, the support frame portion for maintaining a cap portion in a spaced apart relationship with the flange portion;
    the cap portion connected to the support frame portion and covering over the opening;
    a first corrugated filter plate positioned on the flange portion, extending between the cap portion and the first flange portion and positioned transversely between the opening and an end of the flange portion facing the atmosphere, the first corrugated filter plate positioned to said one side of the opening;
    a first collar extending upwards from the first flange portion having a first upstanding wall as a first solid structure as well as a first ventilation region adjacent to the first upstanding wall, the first upstanding wall positioned adjacent to the first corrugated filter plate for shielding against atmospheric particles being driven by wind along the shingles and entering the space between the cap portion and the flange portion, the first upstanding wall only extending partway of space in a first height direction between the flange portion and the cap portion, the first upstanding wall positioned in front of the first corrugated filter plate and adjacent to the shingles;
    a second corrugated filter plate positioned on the flange portion, extending between the cap portion and the second flange portion and positioned transversely between the opening and an end of the second flange portion facing the atmosphere, the second corrugated filter plate positioned to said another side of the opening; and
    a second collar extending upwards from the second flange portion having a second upstanding wall as a second solid structure as well as a second ventilation region adjacent to the second upstanding wall, the second upstanding wall positioned adjacent to the second corrugated filter plate for shielding against atmospheric particles being driven by wind along the shingles and entering the space between the cap portion and the second flange portion, the second upstanding wall only extending partway of space in a second height direction between the flange portion and the cap portion, the second upstanding wall positioned in front of the second corrugated filter plate and adjacent to the shingles; and
    wherein the corrugated filter plates provide for a passage of air between the atmosphere and the opening, the corrugated filter plates having pores sufficient for facilitating the air passage of air through the corrugated filter plates while blocking passage of atmospheric particles through the corrugated filter plates, each of the corrugated filter plates having a plurality of fold lines extending in the height directions between the cap portion and the flange portion.

2. The ridge vent of claim 1 further comprising a second ridge vent panel for positioning adjacent to the first ridge vent panel along the hole, the second ridge vent panel comprising:
    a further second flange portion for resting on the roof, the further second flange portion having the opening for overlapping with the hole, the further second flange portion having a corresponding first flange portion positioned to one side of the opening and a corresponding second flange portion positioned to another side of the opening, such that the corresponding first flange portion and the corresponding second flange portion are at the acute angle with respect to one another;
    a further second frame portion coupled to the further second flange portion and having further sides extending upwardly from the further second flange portion about the opening, the further second frame portion for maintaining a second cap portion in a spaced apart relationship with the further second flange portion;
    the second cap portion connected to the further second frame portion and covering over the opening;
    a corresponding first corrugated filter plate extending between the second cap portion and the further second flange portion and positioned transversely between the opening and the atmosphere, the corresponding first corrugated filter plate positioned to said one side of the opening;
    and a corresponding second corrugated filter plate extending between the second cap and the further second flange portion and positioned transversely between the opening and the atmosphere, the corresponding second corrugated filter plate positioned to said another side of the opening;
    wherein the corresponding corrugated filter plates provide for the passage of the air between the atmosphere and the opening, the corresponding corrugated filter plates having further pores for facilitating the passage of the air through the corresponding corrugated filter plates while blocking passage of the atmospheric particles through the corresponding corrugated filter plates.

3. The ridge vent of claim 1 further comprising a connector portion of the first ridge vent panel positioned on the flange portion and the cap portion for connecting with corresponding connector portion of an adjacent second ridge vent panel, wherein the connector portions when joined are configured for inhibiting passage of atmospheric particles between the adjacent first and second ridge vent panels.

4. The ridge vent of claim 1 further comprising a filter plate connector between the first filter plate and a corresponding first filter plate of a second ridge vent panel when situated adjacent to the first ridge vent panel, the filter plate connector for inhibiting passage of atmospheric particles between the adjacent first filter plate and the corresponding first filter plate.

5. The ridge vent of claim 1 further comprising a first filter plate frame for holding the first filter plate and a second filter plate frame for holding the second filter plate, the first and second filter plate frames for positioning in contact between opposing surfaces of the cap portion and the flange portion.

6. The ridge vent of claim 5, wherein the first filter plate frame and the second filter plate frame are dimensioned to fit inside of an existing ridge vent as replacement inserts.

7. The ridge vent of claim 1 further comprising a block portion positioned at either longitudinal end of the first ridge vent panel for facilitating sealing of the filter plates of the first ridge vent panel with the corresponding filter plates of an adjacent second ridge vent panel.

8. The ridge vent of claim 1 further comprising overlap portions of the filter plates for facilitating sealing of the filter plates of the first ridge vent panel with the corresponding filter plates of an adjacent second ridge vent panel, wherein the overlap portions are provided as adjacent folds in an overlap region in order to inhibit the wind driven passage of the atmospheric particles between the filter plates and the adjacent corresponding filter plates.

9. The ridge vent of claim 1, wherein the first ventilation region are slots in the first collar, the slots provided as a plurality of elongated openings extending in the first height direction between the cap portion and the flange portion.

10. The ridge vent of claim 1, wherein the second ventilation region are slots in the second collar the slots provided as a plurality of elongated openings extending in the second height direction between the cap portion and the flange portion.

11. The ridge vent of claim 8, wherein the overlap region includes overlapping between a fold line of the filter plates with an adjacent fold line of the adjacent corresponding filter plates.

\* \* \* \* \*